(12) United States Patent
Fox

(10) Patent No.: US 6,770,007 B2
(45) Date of Patent: Aug. 3, 2004

(54) EPICYCLIC DRIVE WITH UNIFIED PLANET ASSEMBLIES

(75) Inventor: Gerald P. Fox, Massilon, OH (US)

(73) Assignee: The Timken Company, Canton, OH (US)

(*) Notice: Subject to any disclaimer, the term of this patent is extended or adjusted under 35 U.S.C. 154(b) by 0 days.

(21) Appl. No.: 10/600,227

(22) Filed: Jun. 20, 2003

(65) Prior Publication Data

US 2004/0038771 A1 Feb. 26, 2004

Related U.S. Application Data

(63) Continuation-in-part of application No. 10/177,492, filed on Jun. 21, 2002, now abandoned.

(51) Int. Cl.[7] .............................................. F16H 57/08
(52) U.S. Cl. ...................................................... 475/348
(58) Field of Search ......................................... 475/348

(56) References Cited

U.S. PATENT DOCUMENTS

| | | | |
|---|---|---|---|
| 2,936,655 A | 5/1960 | Peterson et al. | |
| 3,178,966 A | 4/1965 | Wildhaber | |
| 3,937,539 A | 2/1976 | Jones et al. | |
| 4,158,972 A | * 6/1979 | Chamberlain | 475/337 |
| 4,656,890 A | * 4/1987 | Marquardt | 475/348 |
| 4,756,212 A | 7/1988 | Fuehrer | |
| 4,790,210 A | 12/1988 | Müller et al. | |
| 4,834,560 A | 5/1989 | Jacob et al. | |
| 5,037,214 A | 8/1991 | Dougherty | |
| 5,368,528 A | * 11/1994 | Farrell | 475/348 |
| 5,494,358 A | 2/1996 | Dougherty | |
| 6,280,093 B1 | 8/2001 | Ohtsuki et al. | |
| 6,592,264 B2 | 7/2003 | Yabe et al. | |

FOREIGN PATENT DOCUMENTS

| | | |
|---|---|---|
| DE | 2328929 | 12/1973 |
| DE | 4007881 | 9/1991 |
| DE | 19611605 | 9/1997 |

* cited by examiner

*Primary Examiner*—Dirk Wright
(74) *Attorney, Agent, or Firm*—Polster, Lieder, Woodruff & Lucchesi

(57) ABSTRACT

An epicyclic drive has its planet gears integrated into separately built planet assemblies. Each planet assembly, in addition to its planet gear, includes a pin which extends through the planet gear and an antifriction bearing located between the gear and the pin. The outer raceways for the bearing are machined into the gear, whereas the inner raceways are machined into the pin. The bearing also has rolling elements organized in two rows between the inner and outer raceways. The pins have mounting ends which lie beyond the ends of the planet gear to anchor the planet assembly in a carrier. The planet gear and the pin define lubrication channels adjacent each raceway, permitting a flow of lubricating oil to the rolling elements. The bearing, inasmuch as it is assembled separately, is set with considerable precision, preferably in preload, so the planet gear does not skew with respect to sun and ring gears with which it meshes during operation at the epicyclic drive.

12 Claims, 6 Drawing Sheets

EPICYCLIC DRIVE WITH UNIFIED PLANET ASSEMBLIES

CROSS-REFERENCE TO RELATED APPLICATIONS

The present application is a continuation-in-part of U.S. patent application Ser. No. 10/177,492 filed on Jun. 21, 2002 now abandoned, from which priority is claimed.

STATEMENT REGARDING FEDERALLY SPONSORED RESEARCH

Not Applicable.

BACKGROUND OF THE INVENTION

This invention relates in general to epicyclic drives and, more particularly, to an epicyclic drive with unified planet assemblies and to the planet assemblies themselves.

In an epicyclic or planetary drive, the planet gears rotate in a carrier which itself may or may not rotate. Typically, the carrier is of the straddle-mounted variety in which pins extend between two carrier plates, and the planet gears rotate on antifriction bearings carried by the pins. Sometimes each bearing contains two rows of rolling elements, such as tapered rollers or balls, with the rolling elements of the one row being mounted in opposition to the rolling elements of the other row. This enables the bearing for a planet gear to transfer axial loads in both directions, as well as radial loads, between the gear and its pin. The presence of antifriction bearings brings with it demands for a considerable amount of precision. In the first place, the gears must be machined to within close tolerances to receive the outer races of the bearings and the same holds true for the pins over which the inner races fit. During the assembly of an epicyclic gear system the builder must insure that the bearings are adjusted properly. If the bearings are set with too much preload they may fail prematurely. On the other hand, too much end play in the bearings leaves the bearings with excessive internal clearances, and the gear may tilt on its axis and misalign with the sun and ring gears. This produces greater noise and wear in the gears.

The gears of an epicyclic drive require lubrication and so do the bearings on which the planet gears rotate. A low level of oil in the gear case may suffice to provide lubrication for the gears, but a higher level of oil is generally required to lubricate the bearings for the planet gears, inasmuch as they usually operate in an elevated position in the case. Even when the oil level is high enough to supply lubricant to the exterior of the bearings for the planet gears, this does not insure that the oil will enter the bearings and lubricate the raceways and rolling elements. Indeed, it is often necessary to make provision for introducing oil—a second oil supply—into the space between the two rows of rolling elements on which each planet gear rotates. The phenomenon is particularly troublesome during high-speed operation in which oil is flung away from the bearings by the spinning gear faces and carrier or in which oil is naturally pumped centrifugally away from the bearing centers as a consequence of the bearing geometry.

Moreover, since a considerable amount of oil is exposed to the gear teeth, the oil tends to churn. The churning reduces the effective operating oil level and this reduces the availability of lubrication to the bearings. Raising the oil level to accommodate the bearings only increases the churning. The temperature of the oil increases with churning and the capacity of the oil to lubricate lessens. This may lead to pitting in the gear teeth.

BRIEF SUMMARY OF THE INVENTION

The present invention resides in a planet assembly including a planet gear, a pin extended through the planet gear, and a bearing located between pin and gear. The invention also resides in an epicyclic drive including a carrier in which the planet assembly is installed. The pin may be of a one or a two piece-type assembly. The invention further resides in a process for assembling the planet assemblies.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
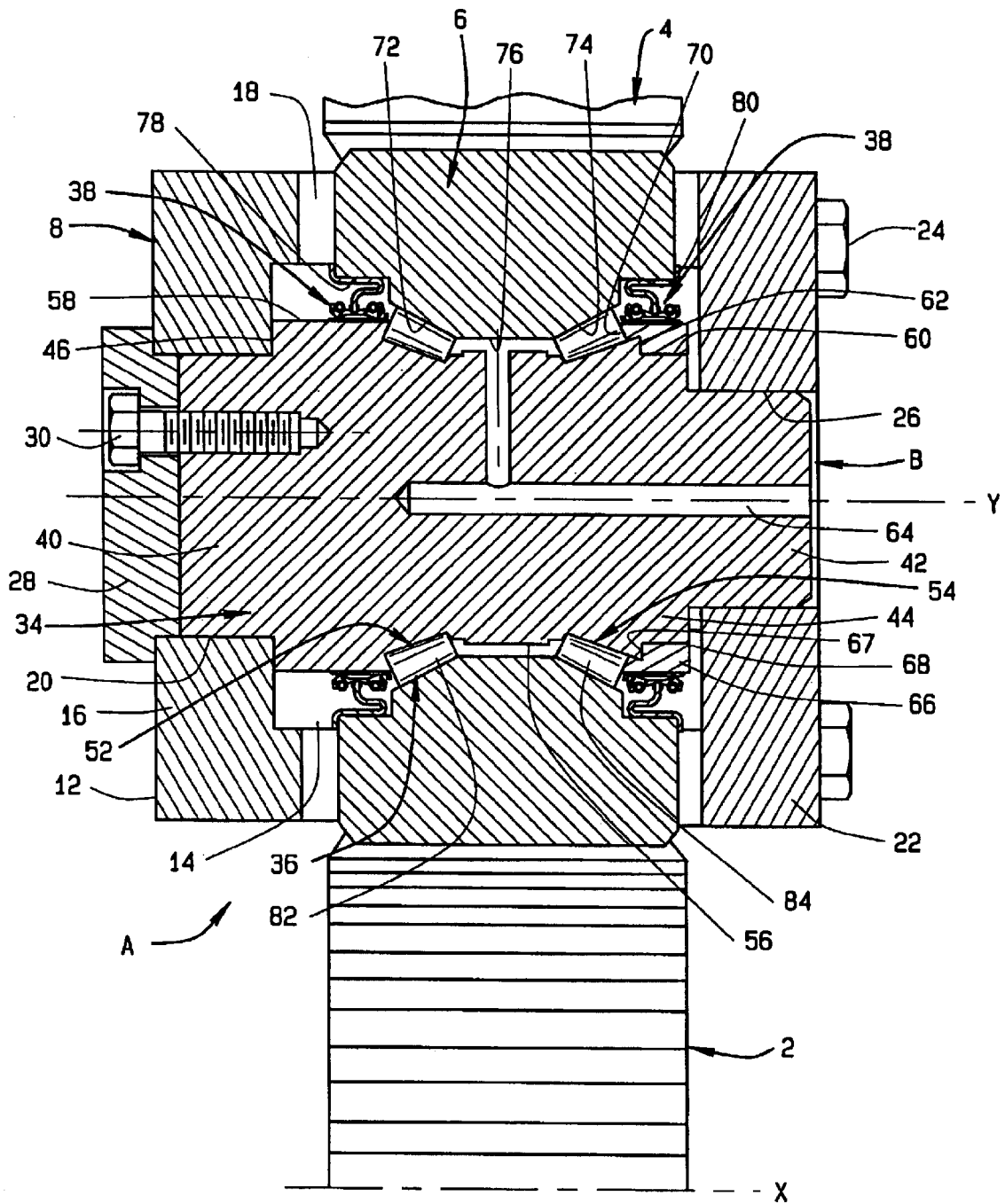
FIG. 1 is a cross-sectional view taken along the axis of a epicyclic drive provided with planet assemblies constructed in accordance with and embodying the present invention.

Referring now to FIG. 1 of the drawings, a portion of an epicyclic drive A is shown organized about an axis X, and includes a sun gear 2, a ring gear 4 located around the sun gear 2, and one or more planet gears 6 located between and engaged with the sun gear 2 and ring gear 4. Whereas the axis of the sun gear 2 and ring gear 4 coincide with the axis X, each planet gear 6 rotates about an axis Y located outwardly from, yet parallel to, the axis X. In addition, the epicyclic drive A includes a carrier 8 which has an axis coinciding with the axis X, yet establishes the axes Y about which individual planet gears 6 rotate.

To reduce friction between the meshing teeth of the planet gears 6, the sun gear 2, and the ring gear 4, a lubricating oil is discharged onto the gears 2, 4, and 6, or else the ring gear 4 and planet gears 6 rotate through a sump containing lubricating oil. Each planet gear 6 forms part of a separate planet assembly B which is assembled apart from the carrier 8 and later installed within the carrier 8.

The carrier 8 includes a cage 12 having pockets 14 in which the planet assemblies B are located. To this end, the cage 12 has an end member or portion 16 extending across the end or bottom of each pocket 14 and separators 18 that project axially from the end portion 16 through the spaces between adjacent planet assemblies B, thus forming the sides of the pockets 14. The end portion 16 has bores 20 centered on the pockets 14, and the bores 20 lie along the axes Y. In addition, the cage 12 has an end plate 22 which lies parallel to the end portion 16 of the cage 12 and is attached to the separators 18 of the cage 12 with cap screws 24, thus closing the opposite ends of the pockets 14. The end plate 22, which forms another end member, contains bores 26 which align with the bores 20 in the end portion 16 of the cage 12 and thus also lie along the axes Y. Finally, the carrier 12 includes a retaining plate 28 through which cap screws 30 pass and thread into the planet assemblies B to prevent the planet assemblies B from displacing axially in their pockets 14.

Figure 2:
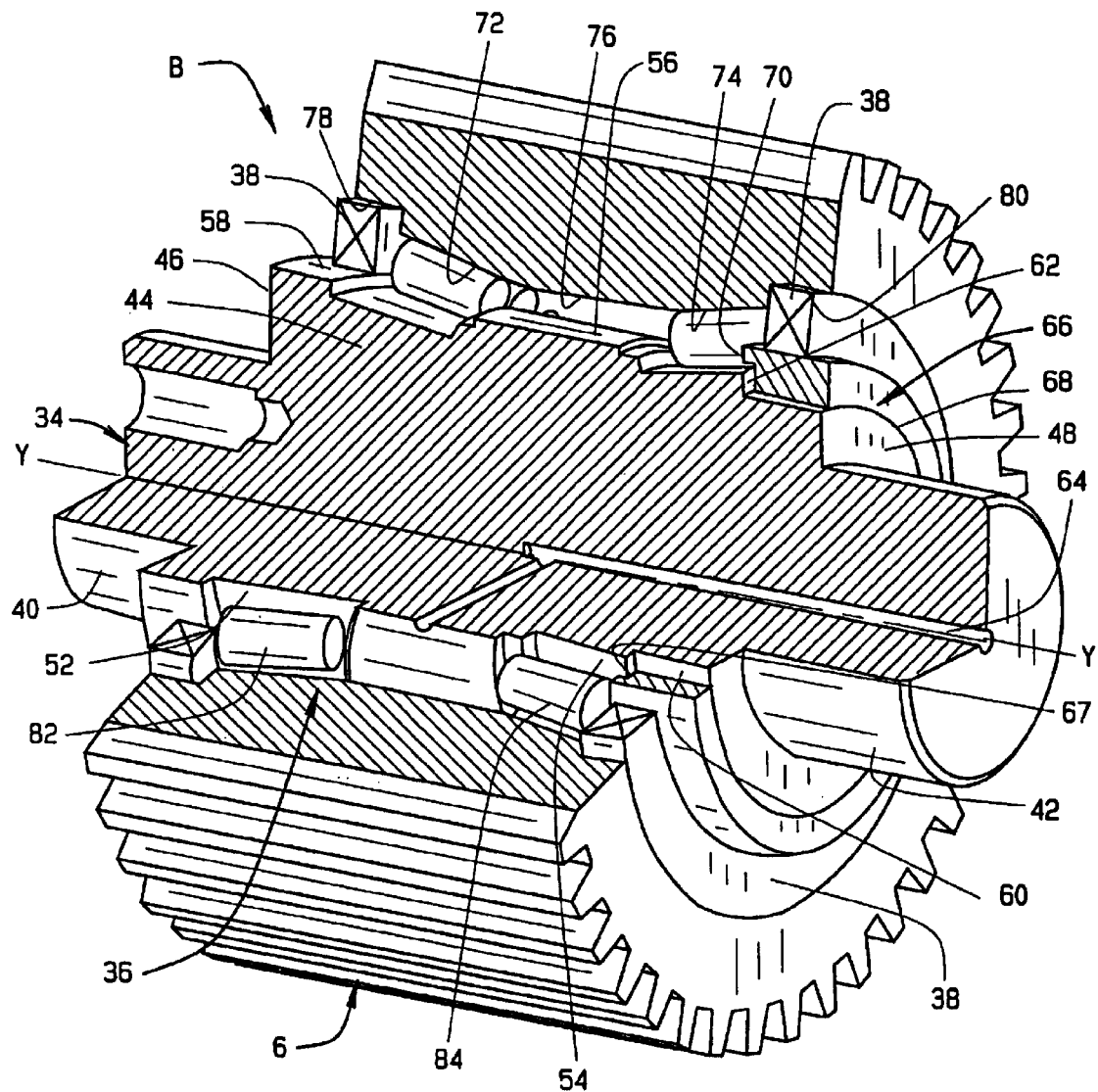
FIG. 2 is perspective view, partially broken away and in section, of the planet assembly for the epicyclic gear drive of FIG. 1.

The planet assemblies B are anchored in the carrier 8 at each pocket 14, with the gears 6 being free to rotate in the pockets 14 of the cage 12 about the axes Y. Each planet assembly B, in addition to its planet gear 6, includes (FIGS. 1 and 2) a unitary pin 34 which extends through the gear 6 and a bearing 36 that enables the gear 6 to rotate on its pin 34 without axial displacement or wobble. In a first embodiment, planet assembly B also includes seals 38 which isolate its bearing 36 from the lubricating oil for the gears 2, 4, and 6.

Considering the pin 34 in more detail (FIGS. 1 and 2), it has cylindrical mounting ends 40 and 42 which project form an enlarged intervening portion 44 that for the most part lies within the planet gear 6. The end 40 projects from the intervening portion 44 at a shoulder 46 and fits into one of the bores 20 in the end portion 16 of the cage 12 with an interference fit. Indeed, the cap screws 30 that pass through the retaining plate 28 thread into the mounting end 40 and draw the shoulder 46 against the end portion 16 of the cage 12. The other mounting end 42 projects from the intervening portion 44 and fits into the aligned bore 26 in the end plate 22, again with an interference fit. When the pin 34 is so fitted to the cage 12 and end plate 22, the shoulder 46 bears against the inside face of the end portion 16 for the cage 12, but the inside face of the end plate 22 may be displaced slightly from the surface of the intervening portion 44.

Two raceways 52 and 54 which are machined into the intervening portion 44, and taper downwardly to a separating rib 56 that lies between them. The raceway 52 leads out to a thrust rib 58 which projects beyond the large end of the raceway 52 and is formed as an integral part of the pin 34. The thrust rib 58, in turn, leads out to the shoulder 46. The other raceway 54 leads out to a cylindrical seat 60 having a diameter less than the large end of the raceway 54, there being a small shoulder 62 between the large end of the raceway 54 and the seat 60. The cylindrical seat 60 leads out to the shoulder 48. The pin 34 contains a lubrication channel 64 which extends axially from one of its ends and then radially, opening out of the pin 34 at its separating rib 56. The two raceways 52 and 54 and the thrust rib 56 form part of the bearing 36.

Whereas the thrust rib 56 for the raceway 52 is formed integral with the pin 34, the thrust rib for the raceway 54 constitutes a separate rib ring 66 which is fitted to the cylindrical seat 60 with an interference fit and has radial positioning face 67 along which it bears against the small shoulder 62 on the pin 34. The rib ring 66 is secured to the pin 34, preferably with a weld 68. Since the rib ring 66 serves as a thrust rib, it has a rib face 70 which projects radially beyond the large end of the raceway 54. The rib ring 66 likewise forms part of the bearing 36.

In addition to the two raceways 52 and 54, the thrust rib 58 and the rib ring 66, the bearing 36 includes two outer raceways 72 and 74 which encircle and are presented toward the two inner raceways 52 and 54, respectively. The outer raceways 72 and 74 taper downwardly to a separating surface 76 which surrounds the separating rib 56 on the pin 34. The outer raceway 72 leads out to and at its large end opens into a counterbore 78 in which the thrust rib 58 on the pin 34 is located. The other outer raceway 74 leads out to and at its large end opens into a counterbore 80 in which the rib ring 66 is located. Finally, the bearing 36 has tapered rollers 82 arranged in a row between the inner and outer raceways 52 and 72 and more tapered rollers 84 arranged in another row between the inner and outer raceways 54 and 74. The rollers 82 have their large ends against the integral thrust rib 58, and indeed the thrust rib 58 prevents the rollers 82 from moving up the raceways 52 and 72 and out of the space between them. The rollers 84 at their large ends bear against the face 70 of the rib ring 66 which prevents the rollers 84 from moving up the raceways 54 and 74 and out of the space between them. The rollers 82 are on apex, meaning that the envelopes defined by the side faces of those rollers 82 have their apices at a common point along the axis Y. Of course, the envelopes formed by the two raceways 52 and 72 have their apices at the same point. Likewise, the rollers 84 are on apex, so the envelopes defined by their tapered side faces have their apices at common point on the axis Y, and the envelopes for the raceways 54 and 74 have their apices at the same point. The on-apex design produces pure rolling contact between the rollers 82 and their raceways 52 and 72 and also between the rollers 84 and the raceways 54 and 74. The bearing 36 preferably does not contain cages, so each row has a full or maximum complement of rollers 82 and 84. To prevent the rollers 82 and 84 of a row from damaging each other, they are coated with a tribological coating consisting of nano crystalline metal carbide particles in an amorphous hydrocarbon matrix to retard metal adhesion. The coatings may be applied by physical vapor deposition, chemical vapor deposition, or a combination of the two. U.S. patent application Ser. No. 10/114,832, filed on April 2, 2002 for the invention of G. Doll and G. Fox entitled "Full Complement Antifriction Bearing" discloses other tribological coatings which will suffice for the rollers 82 and 84 and procedures for applying them. That application is incorporated herein by reference. The bearing 36 contains a lubricant, which is preferably a high performance grease.

The axial position of the rib ring 66 along the cylindrical seat 60 on the pin 34 controls the setting of the bearing 36. Preferably the bearing 36 is set to a condition of preload, although light preload. Even so, the initial setting of the bearing 36 should possess enough preload to enable the bearing 36 to remain in preload with beneficial loading on the rollers 82 and 84 during the operation of epicyclic drive A—operation which will normally cause the gear 6 to assume a temperature higher than the pin 34 owing to friction which develops between the teeth of the gear 6 and the teeth of the sun and ring gears 2 and 4, respectively.

In a first embodiment, shown in FIGS. 1–4, the seals 38 fit into the ends of the gear 6 and around the pin 34 to retain the lubricant, preferably a grease, in the bearing 36 and to exclude from the bearing 36 the oil that lubricates the teeth of the gears 2, 4, and 6, and to exclude debris as well. One seal 38 fits into the counterbore 78 of the gear 6 and around the integral thrust rib 58 for the pin 34 about which the gear 6 rotates, thus creating a dynamic fluid barrier at that end of the gear 6. Another seal 38 fits into the other counterbore 80 and around the rib ring 66, creating another dynamic fluid barrier at the opposite end of the gear 6. Each seal 38 has a stamped metal case, a shield, and an elastomeric seal element that is bonded to the case and bears against the shield along multiple lips. The cases fit into the counterbores 78 and 80, whereas the shields fit over the thrust rib 58 and rib ring 66.

Before the carrier 8 is assembled, enough planet assemblies B must be available to occupy each of the pockets 14 in the cage 12 of the carrier 8. The planet assemblies B are best assembled separately and apart from the assembly of the carrier 8 and the remainder of the drive A. Typically, the manufacturer of the bearings 36 will assemble the planet assemblies B, since they contain the bearings 36 which require adjustment.

To assemble a planet assembly B—indeed, each planet assembly B—the first row of tapered rollers 82 is placed around the inner raceway 52 on the pin 34 with their large ends against the integral thrust rib 58. With the full complement of rollers 82 in place, the gear 6 is installed over the pin 34 until its raceway 72 seats against the rollers 82. This positions the other raceway 74 of the gear 6 opposite the other raceway 54 on the pin 34. Next, the rollers 84 are inserted into the annular space between the raceways 54 and 74—again with the full complement of rollers 84.

Thereupon, the rib ring 66 is pressed over the cylindrical seat 60 on the pin 34 and advanced toward the rollers 84. As the ring 66 approaches the large ends of the rollers 84, the gear 6 is rotated slowly relative to the pin 34 to insure that the rollers 82 seat properly along each raceway 52, 72 and along the thrust rib 58, and that the rollers 84 seat properly along each raceways 54, 74 and along the face 70 of the rib ring 66. The advance of the rib ring 66 continues until the rib ring 66 comes against the small shoulder 62 that lies between the large end of the inner raceway 54 and the cylindrical seat 60. The rib ring 66 controls the setting of the bearing 36, and when it bears against the shoulder 62, the bearing 36 should have the proper setting. In this regard, before the planet assembly B undergoes the foregoing assembly procedure, gauging measurements are made to determine the axial distance between the raceways 52 and 54 on the pin 34, the axial distance between the raceways 72 and 74 in the planet gear 6, and the diameters or body sizes of the rollers 82 and 84. These dimensions having been determined, the correct position of the rib face 70 may be ascertained. Indeed, the rib ring 66 is ground along its positioning face 67 such that when the ring 66 is over the cylindrical seat 60 on the pin 34 and the positioning face 67 is against the shoulder 62, the rib face 70 assumes the correct position. The rib face 70 contact the large ends of the rollers 84 and positions the rollers 82 and 84 of both rows such that the bearing 36 possesses the correct setting—a setting of preload. Once the proper setting is achieved, the rib ring 66 is secured to the pin 34 preferably by laser welding, thus producing the weld 68.

Thereafter one seal 38 is pressed over the thrust rib 58 and into the counterbore 78. The other seal 38 is pressed over the rib ring 66 and into the other counterbore 80.

Before the installation of the gear 6 over the pin 34, the raceways 52 and 72 and likewise the raceways 54 and 74 may be coated with a high performance grease which also should be spread over other critical surfaces such as the face of the thrust rib 58 and the face 70 of the rib ring 66, or the bearing 36 may be lubricated afterwards by forcing the grease through the lubrication channel 64.

The preassembled planet assemblies B are then installed in the carrier 8. In particular, the mounting ends 40 for the pins 34 of the several planet assemblies B are pressed into the bores 20 in the end portions 16 of the cage 12, so that the gears 6 of the planet assemblies B occupy the pockets 14 of the cage 12. The retaining plate 28 is installed against the end portion 16 of the cage 12 and secured to the pins 34 with the cap screws 30. Also, the mounting ends 42 at the opposites ends of the pins 34 are pressed into the bores 26 in the end plate 22. Next the cap screws 24 are passed through the end plate 22 and threaded into the axially directed separators 18 on the cage 12 to attach the end plate 22 to the cage 12.

Thereafter, the sun gear 2 is inserted through the end plate 22 of the carrier 8 and engaged with the planet gears 6. The ring gear 4 is passed over the carrier 12 and likewise engaged with the planet gears 6.

In the operation of the epicyclic drive A, the teeth of the gears 2, 4, and 6 receive enough oil to keep them adequately lubricated, but the oil does not exist in enough volume to undergo significant churning. As a consequence, the oil remains relatively cool. The bearings 36 derive their lubrication from the grease that is packed around the pins 34 and within the gears 6, and the seals 38 isolate this grease from the oil that lubricates the teeth of the gears 2, 4, and 6. Thus, the oil does not dilute and thin the grease, and the grease remains effective.

Being set with considerable precision to a condition of preload, the bearings 36 insure that the axes Y about which the planet gears 6 rotate remain reasonably unaltered. During operation the bearings 36 should not exhibit excessive internal clearances, since such clearances may alter the axes Y Hence, the planet gears 6 remain aligned with the gears 2 and 4, and skewing attributable to bearing clearances is reduced, if not eliminated. This in turn reduces noise and extends the lives of the gears 2, 4, and 6.

Since the inner raceways 52 and 54 are machined directly on the pin 34 and the outer raceways 72 and 74 are machined directly into the gear 6, the bores required to accommodate separate races do not exist, and this eliminates the additional machining required to accommodate such separate races and the tolerances that it would introduce. Thus, the bearing 36 is not compromised by such additional tolerances.

Although the planet assembly B is assembled with grease along the raceways 54, 56, 72, and 74 of bearing 36 and likewise along the face of the thrust rib 58 and the face 70 of the rib ring 66, the bearing 36 may from time to time require additional grease. This grease is introduced through the lubrication channel 64 which at the mounting end 42 of the pin 34 may be provided with a grease fitting. Excessive grease purges through the seals 38. In the alternative, a purge channel may be incorporated into the pin 34, it beginning at the separating rib 56 and opening out of the mounting end 42.

Figure 3:
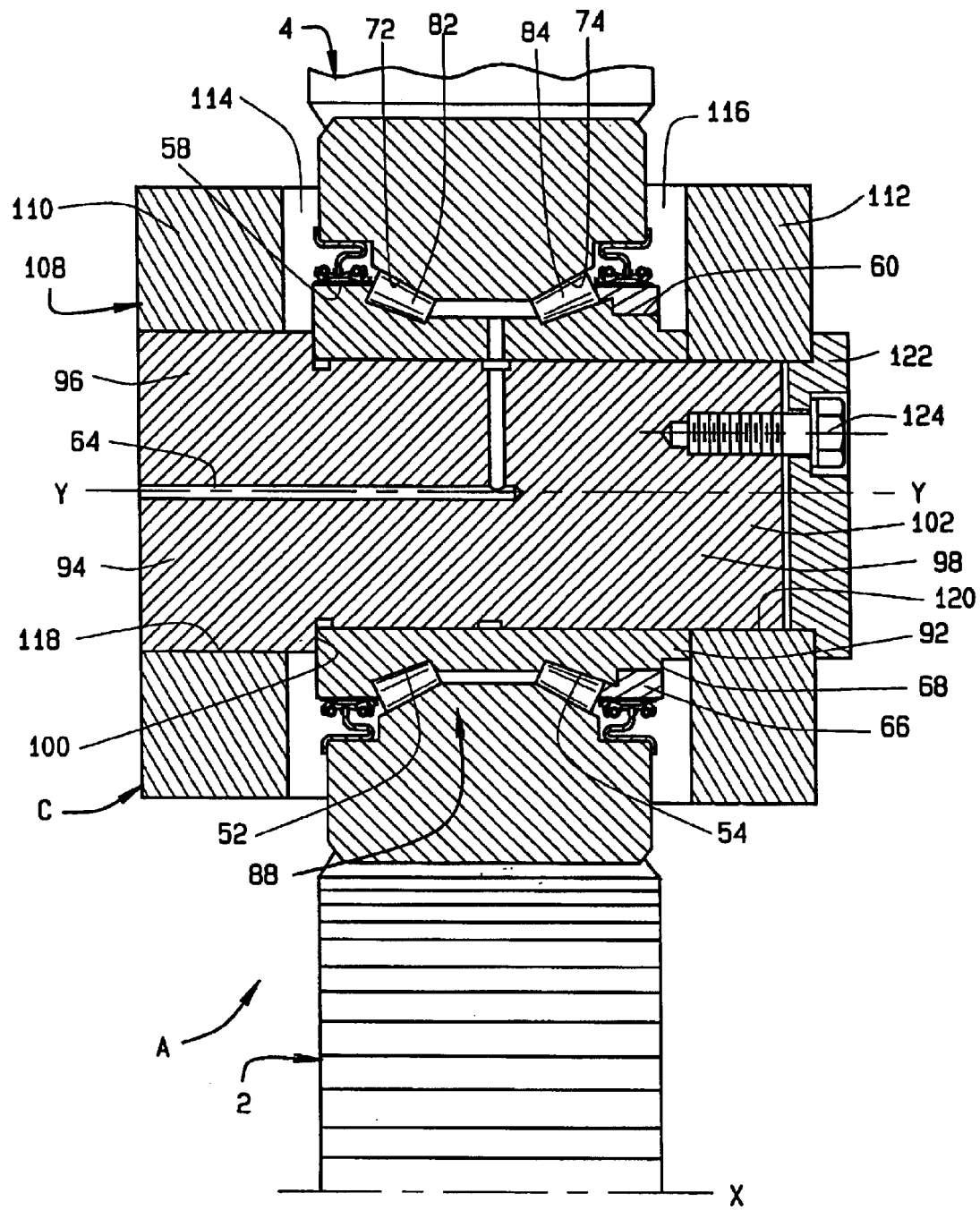
FIG. 3 is a cross-sectional view taken along the axis of an epicyclic drive provided with modified planet assemblies.
Figure 4:
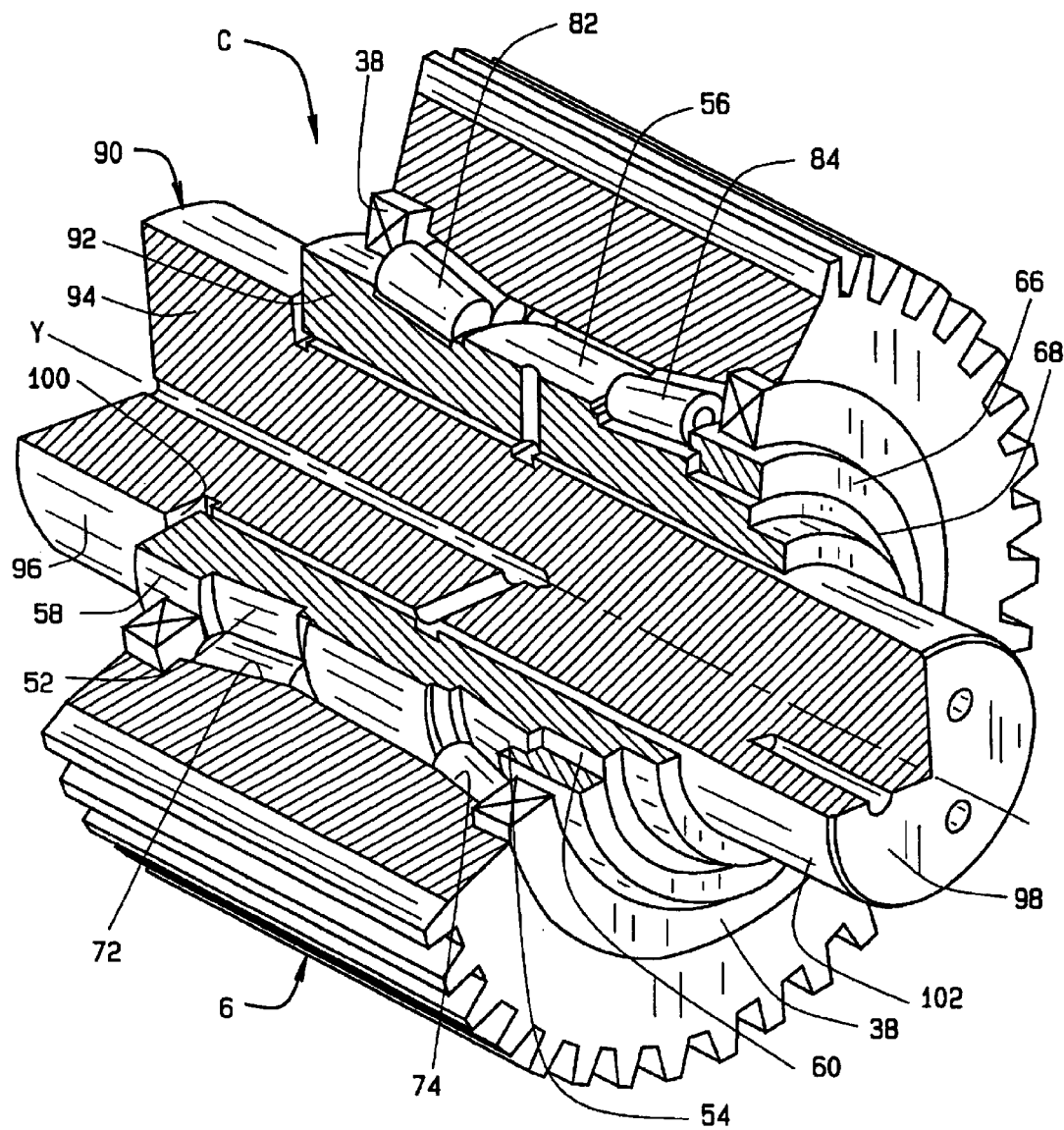
FIG. 4 is a perspective view, partially broken away and in section, of a modified planet assembly.

A modified planet assembly C, shown in FIG. 3 and FIG. 4, utilizes the same planet gear 6 and seals 38. Moreover, it contains a bearing 88 which is quite similar to the bearing 36 in that it includes outer raceways 72 and 74 machined into the gear 6 and tapered rollers 82 and 84 located along those raceways 72 and 74. However, instead of a unitary pin 34, the planet assembly C has a two-piece pin 90 including a sleeve 92 and a core 94 which extends through the sleeve 92, there being a controlled clearance between the two.

The sleeve 92 forms the inner race of the bearing 88 and as such has the two raceways 52 and 54, the integral thrust rib 58 at the large end of the raceway 52, the cylindrical seat 60 extended beyond the large end of the other raceway 54 at a lesser diameter, and the separating rib 56 between the two raceways 52 and 54. Moreover, the sleeve 92 has the rib ring 66 pressed over its cylindrical seat 60.

The core 94 includes a cylindrical mounting end 96 on which one end face of the pin 90 is located and a spindle 98 which projects from the end 96 at a shoulder 100. The spindle 98 runs out to the other end face of the pin 90. The sleeve 92 fits over the spindle 98, and at its integral thrust rib 58 abuts the shoulder 100. The spindle 98 projects beyond the opposite end of the sleeve 92 to form another cylindrical mounting end 102 on the pin 90.

The planet assembly C is assembled much the same as the planet assembly B. However, the bearing 88 is assembled around the sleeve 92 of the pin 90 in the absence of the core 94.

The two-piece construction of the pin 90 renders the planet assembly C suitable for use with a one-piece carrier 108 having spaced apart end portions 110 and 112 and separators 114 extended between the end portions 110 and 112 to divide the space between them into pockets 116. The end portion 110 contains bores 118 centered on its pockets 116, while the end portion 112 has more bores 120 likewise centered on the pockets 116. The bores 118 and 120 at each pocket 116 align along the axis Y at the pocket 116. Fitted against the end portion 112 is a retaining plate 122 which is secured with cap screws 124 that pass through it.

To install the planet assembly C in the one-piece carrier 108, the planet assembly C, absent the core 94 of its pin 90, is inserted into one of the pockets 116 of the carrier 108 and the bore of its sleeve 92 is aligned with the bores 118 and 120 in the end portions 110 and 112 of the carrier 108. The core 94, with the mounting end 102 on its spindle 98 leading, is inserted through the bore 118 in the end portion 110 and the spindle 98 is advanced through the sleeve 92 until the shoulder 100 on the core 94 comes against the end of the sleeve 92 at the thrust rib 58.

The mounting end 96 enters the bore 118 in the end portion 110, whereas the mounting end 102 enters the bore 120 in the end portion 112. Interference fits exist at the mounting ends 96 and 102. Thereupon the retaining plate 122 is installed against the end portion 112 and the cap screws 124 are passed through it and threaded into the cores 94 of the pins 90. This draws the opposite ends of the sleeve 92 against the inside face of the end portion 112, effectively clamping the sleeve 92 between the shoulder 100 on the core 94 and the end portion 112 of the carrier 108.

In lieu of the double-row tapered roller bearings 36 or 88, the planet assemblies B and C may be provided with other types of antifriction bearings, such as ball bearings, angular contact ball bearings, spherical roller bearings, cylindrical roller bearings, or needle bearings.

Figure 5:
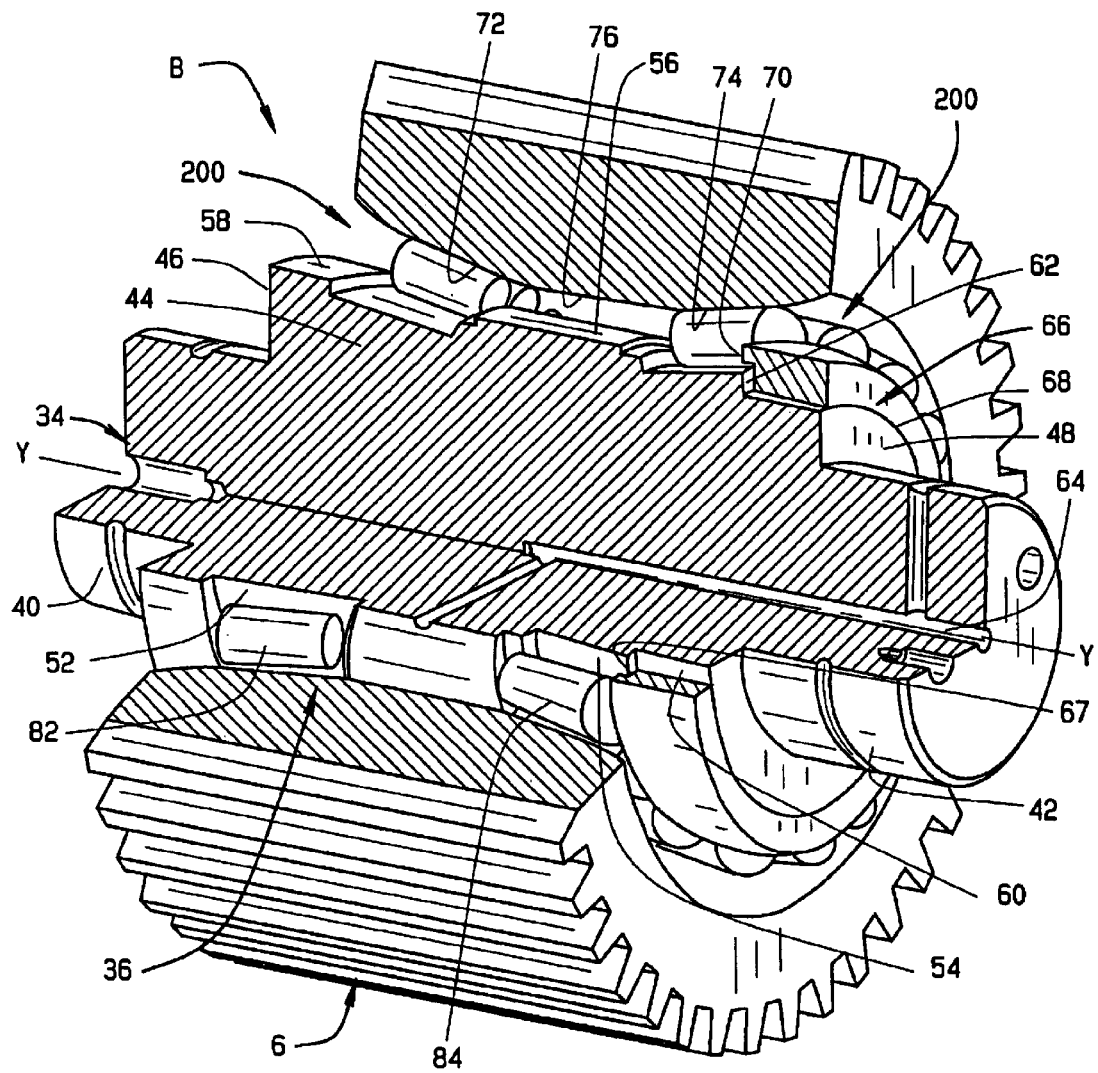
FIG. 5 is a perspective view, partially broken away and in section, of a second modified planet assembly.
Figure 6:
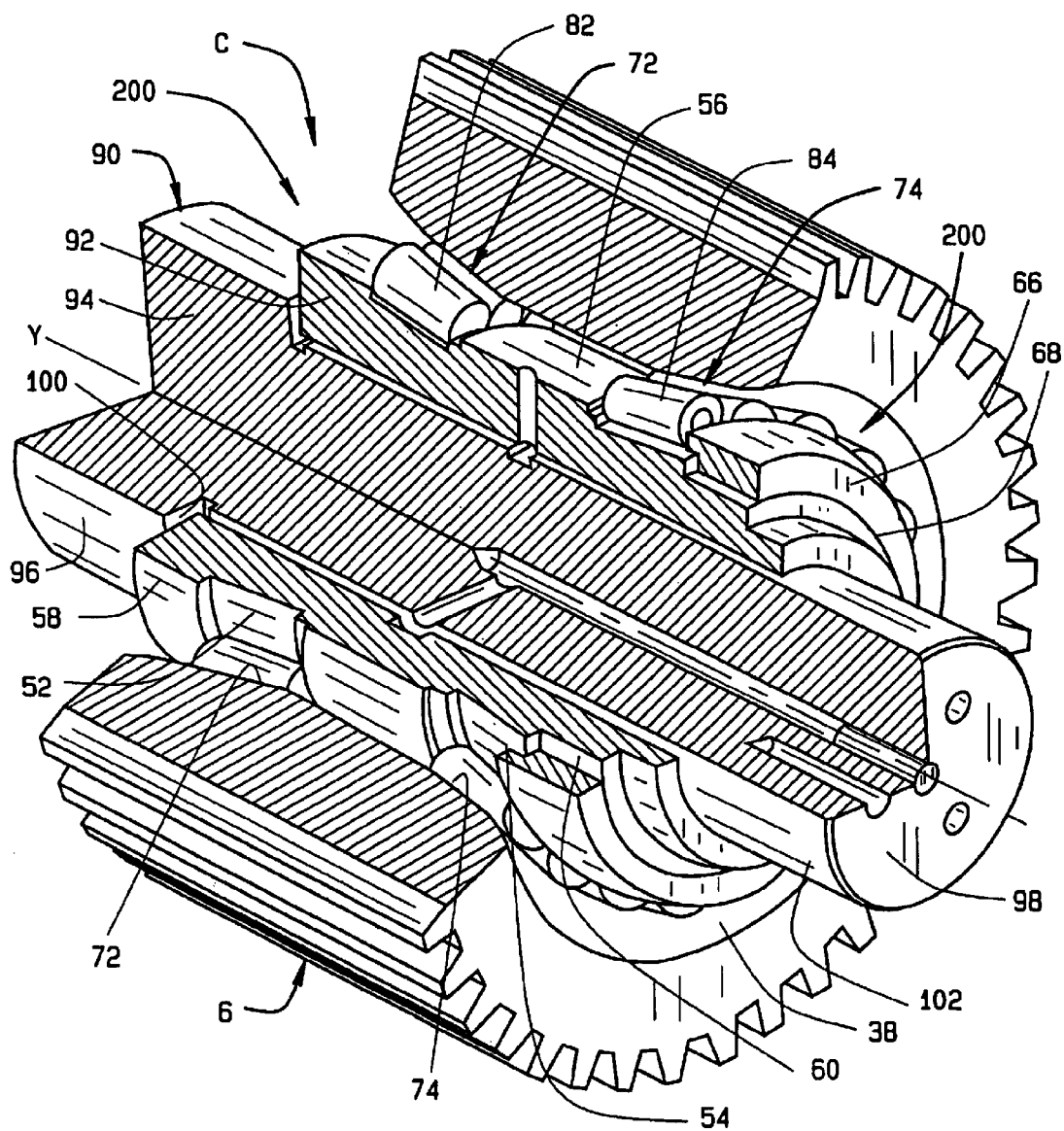
FIG. 6 is a perspective view, partially broken away and in section, of a third modified planet assembly.

In a next variation of the planet assemblies B and C, shown in FIGS. 5 and 6 respectively, a pair of lubrication gaps 200 are left in the ends of the gear 6 and around the pin 34 to permit a flow of lubricant, preferably the lubricating oil which lubricates the teeth of the gears 2, 4, and 6, into the bearing 36. One lubricating gap 200 is defined by the outer raceway 72 of the gear 6 the integral thrust rib 58 for the pin 34 about which the gear 6 rotates, thus creating a circumferential opening at that end of the gear 6. Another lubricating gap 200 is defined by the other outer raceway 74 and around rib ring 66, creating another circumferential opening at the opposite end of the gear 6.

In the operation of the epicyclic drive A, the teeth of the gears 2, 4, and 6 receive enough oil to keep them adequately lubricated, but the oil does not exist in enough volume to undergo significant churning. As a consequence, the oil remains relatively cool. The bearings 36 derive their lubrication from the oil that flows into and around the pins 34 and within the gears 6, through the lubricating gaps 200.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A planet assembly for an epicyclic drive, said planet assembly having an axis and comprising:

a pin having first and second tapered inner raceways located around and presented away from the axis, said first and second raceways tapered radially inward toward each other;

a planet pear located around said pin and carrying first and second outer raceways, said first outer raceway being present toward said first inner raceway and said second outer raceway being presented toward said second inner raceway;

first tapered rolling elements organized in a row between said first raceways;

second tapered rolling elements organized in a row between said second raceways;

wherein said first raceways are oblique to the axis and are inclined in a first common direction with respect to axis, said second raceways are oblique to the axis and inclined in a second common direction with respect to the axis, said second common direction having an opposite inclination to said first common direction, and whereby said first tapered rolling elements are configured to transmit axial loads in one direction and said second tapered rolling elements are configured to transmit axial loads in an opposite direction;

wherein said pin and said planet pear are further configured to define a pair of lubricating gaps circumferentially disposed around opposite ends of said pin, each of said defined lubricating gas exposing at least a portion of said first and second rolling elements to a lubricating fluid flow;

wherein said pin further has a thrust rib at a large end of said first inner raceway to prevent said first tapered rollers from moving up said first raceways and a seat extended beyond said large end of the second inner raceway; and a rib ring fitted over said seat to prevent said second tapered rollers from moving up said second raceways, whereby the axial position of said rib ring on said seat is configured to control clearances or an absence of clearances between said tapered rollers and said raceways.

2. A planet assembly according to claim wherein said pin is a unitary structure.

3. A method of assembling the planetary assembly of claim 1, said method comprising:

placing said first tapered rollers along one of said first raceways;

fitting said pin and gear together such that said first rollers are between said first inner and outer raceways and along said thrust rib;

placing said second tapered rollers between said second raceways; and advancing said rib ring over said seat until said bearing has a desired setting; and securing said rib ring to said pin.

4. The method according to claim 3 wherein the step of securing said rib ring includes welding said rib ring to said pin.

5. The method according to claim 3 wherein said step of placing said first tapered rollers along one of said first raceways includes placing said rollers along said first inner raceway.

6. A planetary assembly according to claim 1 for an epicyclic drive, said planet assembly having an axis and comprising:
   a pin includes including a core, a sleeve disposed around said; core, and first and second inner raceways are disposed on said sleeve around and away from the axis;
   a planet gear located around said pin and carrying first and second outer raceways, said first outer raceway being present toward said first inner raceway and said second outer raceway being presented toward said second inner raceway;
   first rolling elements organized in a row between said first raceways;
   second rolling elements organized in a row between said second raceways; and
   wherein said pin and said planet pear are further configured to define a pair of lubricating gaps circumferentially disposed around opposite ends of said pin, each of said defined lubricating gaps exposing at least a portion of said first and second rolling elements to a lubricating fluid flow.

7. An improved epicyclic drive including a sun gear, a ring gear, and a carrier having a pair of end members, the improvement comprising:
   at least one pin having first and second ends anchored in the end members of the carrier;
   a planet pear located around said pin and being engaged with the sun and ring gears;
   an antifriction bearing located between said pin and planet gear, said antifriction bearing including
      first and second inner raceways carried by the pin,
      first and second outer raceways carried by the planet gear, said first and second outer raceways presented toward, and located opposite, said first and second inner raceways, said first raceways oblique to the axis and tapered inward relative to a first common direction with respect to the axis, said second raceways oblique to the axis and tapered inward relative to a second common direction with respect to the axis, said second common direction having an opposite inclination from said first common direction such that said first and second raceways taper towards each other;
      first tapered rolling elements arranged in a row between said first raceways, and
      second tapered rolling elements arranged in a row between the second raceways; whereby said first rolling elements are configured to transmit axial loads in one direction and said second rolling elements are configured to transmit axial loads in the opposite direction;
   wherein the planet gear and said pin define a lubrication gap adjacent each of said first raceways and said second raceways, said lubrication gaps configured to permit a flow of lubricating fluid to said first and second rolling elements;
   wherein said pin further includes a thrust rib at a large end of the first inner raceway to prevent said first rollers from moving up the first raceways and a seat extended beyond the large end of the second raceway; and
   wherein said bearing further comprises a rib ring fitted over said seat to prevent said second rollers from moving up said second raceways, whereby the axial position of the rib ring on the seat controls the setting of the bearing.

8. The combination according to claim 7 wherein the carrier further comprises separators extending between the end members to form at least one pocket in which the planet gear rotates.

9. A planet assembly for an epicyclic drive, said planet assembly comprising:
   a pin provided with mounting ends and first and second tapered inner raceways located between said mounting ends, each of said raceways tapering in opposite directions downwardly toward each other, said pin further having a thrust rib projecting beyond a large end of said first inner raceway and a seat extending axially beyond said large end of said second inner raceway;
   a planet gear located around said pin and having first and second tapered outer raceways presented toward and located opposite said first and second inner raceways, respectively, said gear being narrower then said pin is long, such that said mounting ends of said pin are located beyond the ends of the gear;
   first tapered rollers located between said first inner and outer raceways and against said thrust rib, whereby said thrust rib prevents said first rollers from moving up said first raceways;
   second tapered rollers located between said second tapered raceways;
   a rib ring fitted over said seat on said pin and against said second tapered rollers to prevent said second rollers from moving up said second raceways; and
   wherein said planet gear and said pin define a circumferential lubrication gap adjacent each of said first and second tapered raceways, said circumferential lubrication gap configured to permit a flow of lubricating fluid to said first and second tapered rollers.

10. A planet assembly according claim 9 wherein said rib ring is welded to said pin.

11. A planet assembly according to claim 9 wherein said inner raceways are machined on said pin and said outer raceways are machined into said planet gear.

12. A planet assembly according to claim 9 wherein said pin comprises a core and a sleeve located around said core; wherein said inner raceways thrust rib and ring seat are on said sleeve; and wherein said core projects beyond said ends of said sleeve and forms said mounting ends of said pin.

* * * * *

UNITED STATES PATENT AND TRADEMARK OFFICE
CERTIFICATE OF CORRECTION

PATENT NO. : 6,770,007 B2  Page 1 of 1
DATED : August 3, 2004
INVENTOR(S) : Gerald P. Fox It is certified that error appears in the above-identified patent and that said Letters Patent is hereby corrected as shown below:

Column 8,
Line 18, replace "pear" with -- gear --.
Line 54, after "claim" insert -- 1 --.

Column 9,
Line 8, delete "according to claim 1".
Line 11, after "pin," delete "includes".
Line 12, after "said", delete ";", and after "raceways", delete "are".
Line 24, replace "pear" with -- gear --.
Line 35, replace "pear" with -- gear --.

Signed and Sealed this

Twenty-eighth Day of March, 2006

JON W. DUDAS
*Director of the United States Patent and Trademark Office*